H. BENTZ.
GAS WASHER.
APPLICATION FILED JUNE 5, 1914.
1,117,309.
Patented Nov. 17, 1914.
3 SHEETS—SHEET 1.
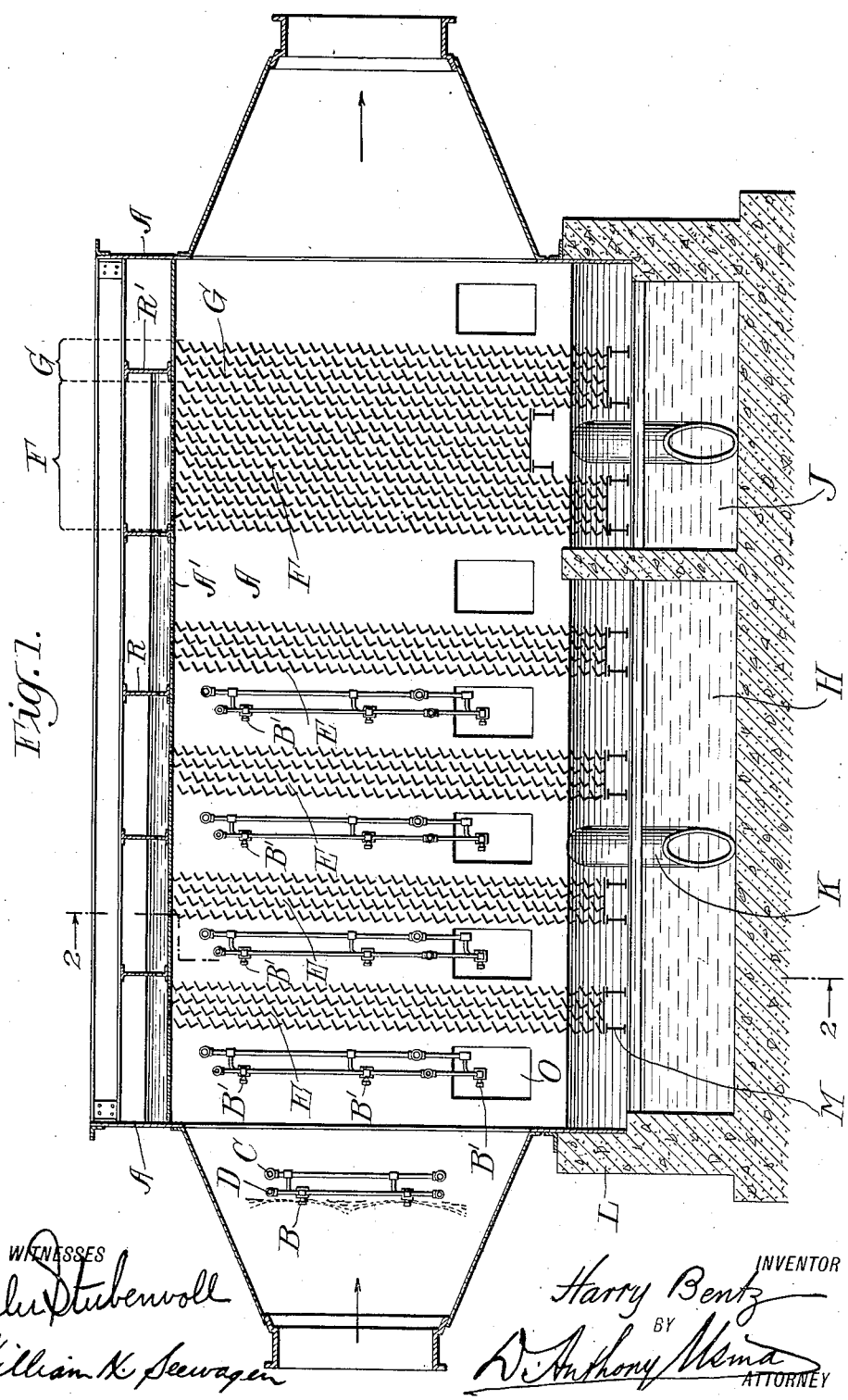

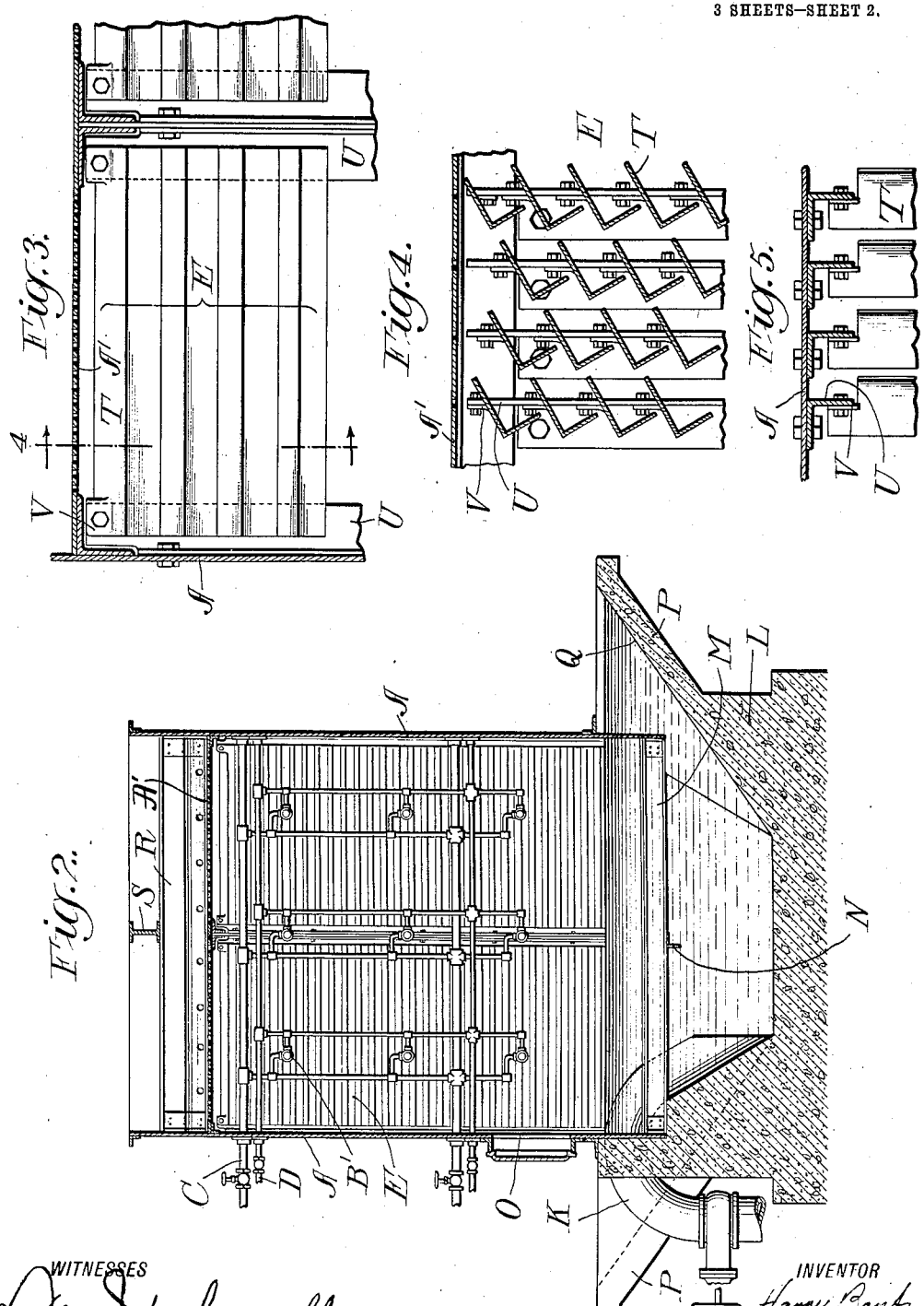

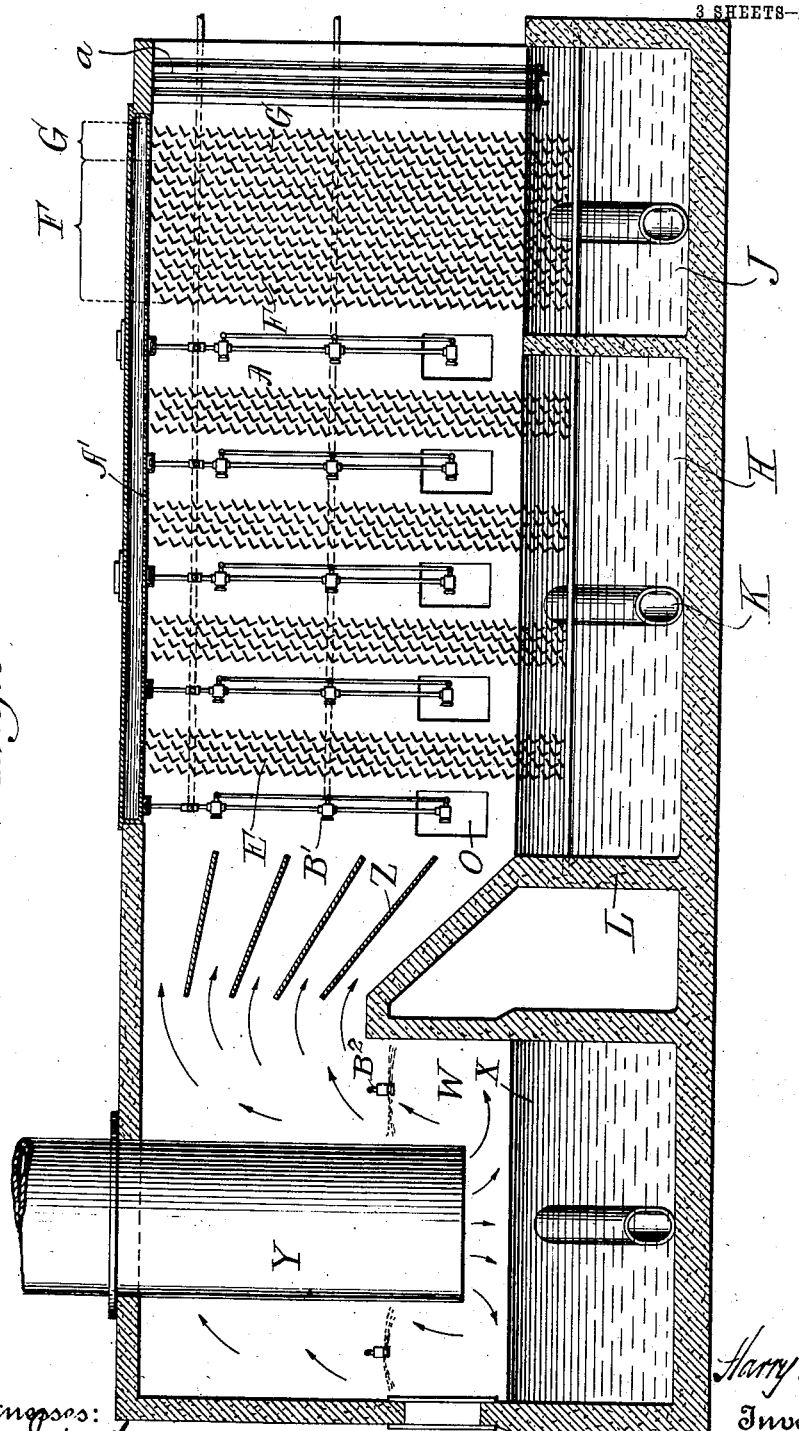

UNITED STATES PATENT OFFICE.

HARRY BENTZ, OF MONTCLAIR, NEW JERSEY.

GAS-WASHER.

1,117,309. Specification of Letters Patent. Patented Nov. 17, 1914.

Application filed June 5, 1914. Serial No. 843,185.

*To all whom it may concern:*

Be it known that I, HARRY BENTZ, a citizen of the United States, residing in Montclair, New Jersey, have invented certain new and useful Improvements in Gas-Washers, of which the following is a specification.

My invention aims to provide an improved gas washer by which the gas can be very thoroughly and economically washed.

The accompanying drawings illustrate apparatus embodying the invention.

Figure 1 is a longitudinal section through a complete washer; Fig. 2 is a transverse vertical section on the line 2—2 of Fig. 1; Fig. 3 is an enlargement of a portion of Fig. 2; Fig. 4 is a vertical section on the line 4—4 of Fig. 3; Fig. 5 is a horizontal section through Fig. 4, showing the plates in plan; Fig. 6 is a longitudinal vertical section of another style of washer embodying the invention.

The embodiments of the invention illustrated are of the combined spray and contact type. The gas passes first through a fine spray or mist which coacts the fine solid particles carried in the gas, after which the gas passes through and between a series of plates over which a film of water flows. The water catches the solid particles enlarged by their coating of moisture from the spray, and washes them away. This spraying and contact operation is repeated, and I find that a greater efficiency is secured for the same quantity of water by dividing the operation into successive stages in this way. The operation is repeated a number of times depending upon the nature of the gas to be washed; it being understood that the washer may be designed and proportioned for washing various gases or for washing air.

A current of gas produced by suction fans, blowers, or other means passes in the direction of the arrows through the casing A. It first encounters a body of fine spray or mist extending in the manner of a diaphragm across the casing and produced by the spray nozzles B. This may sufficiently wet the gas for the purpose desired or it may have to pass through a second body of spray produced by a number of nozzles B' and extending in the manner of a diaphragm across the casing. These spray nozzles may be of any desired construction. The nozzles are supplied with water from a pipe C and with steam from a pipe D, and suitable branches and connections are provided to distribute the nozzles substantially uniformly in the cross section of the current of gas as indicated for example in Fig. 2.

After passing through the spray the gas encounters a series of plates, indicated generally by the reference letter E, which extend horizontally across the casing and are located close together so as, by reducing the space through which the gas passes, to increase its velocity. Films or streams of water are caused to flow constantly over said plates. The contact of the gas with the wet plates causes the solid particles, even those which were originally very fine, but have been enlarged by their passage through the spray, to stick to the surfaces of the plates and to be carried away with the water which runs over such surfaces. In this way particles which are fine enough to be carried in suspension in the gas are largely, and by a repetition of the process, are very thoroughly, taken out of suspension and carried away. In addition, the step by step operation, taking only a portion of the dirt out of the gas at each stage, makes it easier to keep the nozzles and plates from becoming clogged, since each set of nozzles and plates is designed to take care of only a fraction of the total amount of the dirt in the gas.

Owing to possible imperfections and irregularities in the distribution of the spray and in the distribution of the water upon the plates, and owing to irregularities in the condition of the gas the first spray and contact operation will seldom produce a thorough elimination of solid particles, no matter how extensive such first operation may be. I provide, therefore, for a repetition of the spraying and contact operation upon the gas which has been once washed in this way; and in fact for four successive washings of this character by means of a succession of groups of nozzles B' each followed by a series of plates E. With this apparatus there is a step by step elimination of dirt which will serve to thoroughly cleanse the dirtiest gas. In this step by step operation it will be observed also that there is an alternate increase of the velocity of the gas as it passes through the plates and diminution of such velocity as it passes through the body of spray; as well as a change of direction of the gas due to the angular position of the passages between the plates; and this change in velocity and direction assists in causing the solid particles to be deposited from suspension in the gas. The spray is comparatively warm, being formed by the mixture of steam and water, while the contact plates are cold because of the constant flowing of water over them and the evaporation of such water; and this comparative coldness of the plates tends to cause a precipitation of the moistened particles in the gas.

After passing through the last series of contact plates E the gas passes through a series of plates F identical in construction and arrangement and carrying also films or streams of water on their surfaces. The function of the series F of contact plates, however, is chiefly the cooling of the gas and the condensing of the moisture therein. The gas is so clean when it arrives at the series of plates F that there will be little or no extraction of dirt by these plates. But practically all water vapor in excess of saturation at circulating water temperature will be condensed out of the gas by its contact with the wet cold plates or sheds F. And as the gas passes over one after another of these plates its temperature will be gradually lowered to a point close to that of the circulating water. The series F of cooling and condensing plates constitutes twelve lines of plates. Following the series F is a series G consisting of three lines of plates of the same design and arrangement. But the plates of the series G are not supplied with constantly running water like the plates of the previous series. Their function is to extract or eliminate any entrained moisture which may be carried by the gas after it passes through the series F of plates. When the gas escapes from the last series of plates G it is purified, cooled and free from entrained moisture to such an extent as to be ready for use in stoves, boilers, gas engines and other gas fired apparatus.

The comparatively dirty water from the dirt eliminating plates, that is from the plates whose chief function is the elimination of dirt, collects at the bottom in a sump H while the water which runs off from the cooling and condensing and moisture eliminating plates, or from the plates whose chief functions are the cooling and condensing of the gas or the elimination of moisture therefrom, is comparatively clean and is collected in a separate sump J so that it may be reused. The water in both sumps stands at a level above the lower edges of the several series of contact plates so as to compel the gas to pass through such plates. The water is drawn off and its level maintained by siphons K. The casing is formed of a concrete base L in which are formed the sumps, and upon which the sheet metal shell A is mounted. The contact plates are supported upon transverse beams M resting upon the side walls of the concrete base as shown in Fig. 2 and supported at their centers by a longitudinal beam N. Openings O are located in the side of the sheet metal casing. The arrangement of the series of contact plates provides spaces between them and the openings O are conveniently provided in such spaces so as to permit access to the interior; each of the openings being covered by a plate as shown in Fig. 2 while the apparatus is in operation.

The concrete base is provided at one or both sides at any convenient points with extensions P in which are openings Q communicating with the interior and open to the atmosphere, but sealed by the water which stands at a level inside and outside above the lower edge of the side of the sheet metal casing A. These openings Q form a vent in case of excessive interior pressure, which would overcome the water seal and permit a certain quantity of gas to escape. They also permit easy access for removal of deposits in the bottom of the sump tank without the necessity of interrupting the operation of the apparatus.

The water for the contact plates is obtained from an overhead tank. The roof A' of the casing constitutes the base of this tank, the sides and ends of which are formed by upward extensions of the side and end walls of the sheet metal casing or shell A. The bottom is braced by suitable transverse beams R and a central longitudinal beam S. The bottom A' of the tank is formed with perforations, as shown most clearly in Fig. 3, of small diameter and placed close together in line with the vertical lines of contact plates. In previous constructions in which water has been fed through perforated plates it has been found that the perforations sometimes become clogged and that the keeping of them clean involves considerable difficulty. By the use of a tank which is open, access may be had to the perforations in the plate by means of wire brushes operated in the water. The water must be maintained of sufficient depth to prevent the escape of gas through the perforations. The transverse beams R are perforated near their base with the single exception of the beam R' nearest the exit end of the casing. The water passes freely through all the other transverse beams and the tank proper extends from the front end of the casing to the transverse beam R'. No water is provided in the compartment between the beam R' and the exit end of the casing, this portion of the roof overlying the moisture-eliminating plates G which are intended to be dry (except for the moisture precipitated upon them out of the gas).

Figs. 3, 4 and 5 illustrate the construction and mounting of the contact plates. In each vertical series designated as a whole by the letter E there are a number of horizontally extending plates F approximately L-shaped in cross section and arranged in angular positions with each one overlapping the next so that the gas is caused to pass over their forward surfaces and through the narrow openings between them. The plates of one series are staggered relatively to those of the next series so that the gas passing through the spaces of one series will strike the plates of the next. The water from the uppermost plate E will be blown to some extent up the upwardly extending leg of the plate so as to keep the latter wet and will run over the forward edge and down the downwardly extending leg onto the next plate so as to strike the latter at a point well in the rear of its forward edge. By this construction and by reason of the action of the current of gas the water will be held closely and spread effectively upon the plates. The plates are supported upon uprights U at the sides and center of the casing, each plate having end flanges V bent to a vertical direction and bolted upon the uprights U. By this arrangement the plates can be quickly and easily mounted or taken down.

In addition to the spray and contact plates described, the apparatus may be designed to include means for eliminating the coarsest dirt by impact upon the surface of a body of water, as in Fig. 6. Here a chamber W is provided in the bottom of which is a body of water X upon the surface of which the gas is directed through the pipe Y. Thereafter the gas may be passed through the spray from nozzles B² and thence by way of guiding plates Z to prevent channeling, to nozzles B' and series of contact plates E as before. In this construction I have shown a variation in which additional zig zag vertical plates a are used for a final elimination of moisture. In this figure also the tank or conduit over the perforated top A' of the casing is a shallow closed conduit.

Various other modifications and additions may be made. In fact, though I have described with great particularity of detail certain specific embodiments of my invention, yet it is not to be understood therefrom that the invention is restricted to the particular embodiments disclosed.

What I claim is—

1. A gas washer including in combination a casing having a gas inlet and a gas outlet through which a current of gas passes, means for maintaining a body of mist through which the gas passes and which coats the fine solid particles in the gas, a series of plates between which the gas passes and which are located close together so as to increase the velocity of the gas, means for providing a film of water constantly flowing over said plates to take such coated solid particles out of suspension and carry them away, and means for eliminating the entrained moisture comprising a series of plates without such film of water over which the gas passes after substantial removal of the solid particles therefrom.

2. A gas washer including in combination a casing having a gas inlet and a gas outlet through which a current of gas passes, means for maintaining a body of mist through which the gas passes and which coats the fine solid particles in the gas, a series of plates between which the gas passes and which are located close together so as to increase the velocity of the gas, means for providing a film of water constantly flowing over said plates to take such coated solid particles out of suspension and carry them away, an additional series of plates between which the gas passes after substantial elimination of such particles, and means for providing a film of water constantly flowing over said additional plates and serving chiefly to cool the gas and condense the moisture therein.

3. A gas washer including in combination a casing having a gas inlet and a gas outlet through which a current of gas passes, means for maintaining a body of mist through which the gas passes and which coats the fine solid particles in the gas, a series of plates between which the gas passes and which are located close together so as to increase the velocity of the gas, means for providing a film of water constantly flowing over said plates to take such coated solid particles out of suspension and carry them away, an additional series of plates between which the gas passes after substantial elimination of such particles, and means for providing a film of water constantly flowing over said additional plates and serving chiefly to cool the gas and condense the moisture therein, a sump for receiving the comparatively dirty water from said dirt-eliminating plates and a separate sump for receiving the comparatively clean water from said cooling and condensing plates.

4. A gas washer including in combination a casing having a gas inlet and a gas outlet through which a current of gas passes, means for maintaining a body of mist through which the gas passes and which coats the fine solid particles in the gas, a series of plates between which the gas passes and which are located close together so as to increase the velocity of the gas, means for providing a film of water constantly flowing over said plates to take such coated solid particles out of suspension and carry them away, an additional series of plates between which the gas passes after substantial elimination of such particles, and means for providing a film of water constantly flowing over said additional plates and serving chiefly to cool the gas and condense the moisture therein and a series of final plates without a constant water film, over which plates the gas passes for eliminating entrained moisture.

5. A gas washer including in combination a casing having a gas inlet and a gas outlet through which a current of gas passes, means for maintaining a body of mist through which the gas passes and which coats the fine solid particles in the gas, a series of plates between which the gas passes and which are located close together so as to increase the velocity of the gas, means for providing a film of water constantly flowing over said plates to take such coated solid particles out of suspension and carry them away, an additional series of plates between which the gas passes after substantial elimination of such particles, and means for providing a film of water constantly flowing over said additional plates and serving chiefly to cool the gas and condense the moisture therein and a series of final plates without a constant water film, over which plates the gas passes for eliminating entrained moisture, a sump for receiving the comparatively dirty water from said dirt-eliminating plates and a separate sump for receiving the comparatively clean water from said cooling and condensing plates and said final plates.

6. A gas washer including in combination a casing having a gas inlet and a gas outlet through which a current of gas passes in a horizontal direction, a series of plates in said casing extending transversely to the direction of the current of gas and having narrow spaces between them, means for maintaining in front of said plates in the path of the gas moving toward said plates a body of mist and means for providing an additional supply of water constantly flowing in a film over the faces of said plates against which the gas strikes, so that the fine solid particles in the gas are coated with moisture by said mist and extracted and carried off by the additional supply of water flowing over said plates.

7. A gas washer including in combination a casing having a gas inlet and a gas outlet, a succession of devices in said casing for extracting the dirt from the gas, each device comprising a series of plates having faces lying transverse to the direction in which the gas strikes them, means for providing a film of water constantly flowing over the faces of said plates against which the gas strikes, and means for maintaining in front of said plates in the path of the gas moving toward said plates a body of mist, so that the fine solid particles in the gas are coated with moisture while the gas moves at a comparatively slow velocity and are then extracted and carried off by the flowing water while the gas moves at a greater velocity, whereupon the velocity of the gas is checked and the operations repeated until substantially all the dirt is removed.

8. A gas washer including in combination a casing having a gas inlet and a gas outlet, a succession of devices in said casing for extracting the dirt from the gas, each device comprising in combination a means for maintaining a body of mist through which the gas passes, a series of plates between which the gas passes and which are located close together and means for providing a film of water constantly flowing over said plates, whereby the fine solid particles in the gas are coated with moisture while the gas moves at a comparatively slow velocity and are then extracted and carried off by the flowing water while the gas moves at a greater velocity, whereupon the velocity of the gas is checked and the operations repeated until substantially all the dirt is removed, and means for eliminating the entrained moisture comprising a series of plates without such film of water over which the gas passes after substantial elimination of the solid particles therefrom.

9. A gas washer including in combination a casing having a gas inlet and a gas outlet, a succession of devices in said casing for extracting the dirt from the gas, each device comprising in combination a means for maintaining a body of mist through which the gas passes, a series of plates through which the gas passes and which are located close together and means for providing a film of water constantly flowing over said plates, whereby the fine solid particles in the gas are coated with moisture while the gas moves at a comparatively slow velocity and are then extracted and carried off by the flowing water while the gas moves at a greater velocity, whereupon the velocity of the gas is checked and the operations repeated until substantially all the dirt is removed, an additional series of plates over which the gas passes after substantial elimination of the solid particles therefrom and means for providing a film of water constantly flowing over said additional plates and serving to cool the gas and condense the moisture therein.

10. A gas washer including in combination a casing having a gas inlet and a gas outlet, a succession of devices in said casing for extracting the dirt from the gas, each device comprising in combination a means for maintaining a body of mist through which the gas passes, a series of plates through which the gas passes and which are located close together and means for providing a film of water constantly flowing over said plates, whereby the fine solid particles in the gas are coated with moisture while the gas moves at a comparatively slow velocity and are then extracted and carried off by the flowing water while the gas moves at a greater velocity, whereupon the velocity of the gas is checked and the operations repeated until substantially all the dirt is removed, an additional series of plates over which the gas passes after substantial elimination of the solid particles therefrom and means for providing a film of water constantly flowing over said additional plates and serving to cool the gas and condense the moisture therein, and a series of final plates without such film of water, over which plates the gas passes for eliminating entrained moisture.

11. A gas washer including in combination a casing through which a current of gas passes, means for maintaining a body of water, means for directing the gas upon the surface thereof to extract a portion of the dirt therefrom, means for maintaining a body of mist through which the gas passes and which coats the fine solid particles in the gas, a series of plates between which the gas passes and which are located close together so as to increase the velocity of the gas, means for providing a film of water constantly flowing over said plates to take such coated solid particles out of suspension and carry them away.

12. A gas washer including in combination a casing through which a current of gas passes, means for maintaining a body of water, means for directing the gas upon the surface thereof to extract a portion of the dirt therefrom, means for maintaining a body of mist through which the gas passes and which coats the fine solid particles in the gas, a series of plates between which the gas passes and which are located close together so as to increase the velocity of the gas, means for providing a film of water constantly flowing over said plates to take such coated solid particles out of suspension and carry them away, an additional series of plates between which the gas passes after substantial elimination of such particles, and means for providing a film of water constantly flowing over said additional plates and serving chiefly to cool the gas and condense the moisture therein and a series of final plates without a constant water film, over which plates the gas passes for eliminating entrained moisture.

13. A gas washer including in combination a casing having a gas inlet and a gas outlet through which a current of gas passes in a horizontal direction; a vertical series of horizontally extending plates which are approximately L-shaped in cross section and which are arranged close to one another and in angular positions with each one overlapping the next so as to cause the gas to pass over their surfaces and through the narrow openings between them, and means for providing a film of water constantly flowing over those faces of said plates upon which the current of gas is directed.

14. A gas washer including in combination a casing having a gas inlet and a gas outlet through which a current of gas passes in a horizontal direction; a plurality of vertical series of horizontally extending plates which are approximately L-shaped in cross section and which are arranged in angular positions, the plates of one series being staggered with those of the next series, and means for providing a film of water constantly flowing over those faces of said plates upon which the current of gas is directed.

15. A gas washer including in combination a casing having a gas inlet and a gas outlet through which a current of gas passes in a horizontal direction; supporting uprights and a vertical series of horizontally extending plates, said plates having flanges which are bolted to said uprights, whereby said plates may be readily assembled and disassembled, and means for providing a film of water constantly flowing over those faces of said plates upon which the current of gas is directed.

16. A gas washer including in combination a concrete base constituting a tank for retaining water, a casing supported on said base and series of contact plates extending across said casing and from the top thereof down below the water level in said tank and supported by said concrete base.

In witness whereof, I have hereunto signed my name in the presence of two subscribing witnesses.

HARRY BENTZ.

Witnesses:
 D. ANTHONY USINA,
 LULU STUBENVOLL.